(12) United States Patent
Nakamura et al.

(10) Patent No.: US 6,950,287 B2
(45) Date of Patent: Sep. 27, 2005

(54) DISK DRIVE HAVING A TWO-STAGE ACTUATOR FOR SUPPRESSING A FLYING-HEIGHT FLUCTUATION

(75) Inventors: Shigeo Nakamura, Odawara (JP); Haruhide Takahashi, Odawara (JP); Kousaku Wakatsuki, Odawara (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 54 days.

(21) Appl. No.: 10/372,921

(22) Filed: Feb. 26, 2003

(65) Prior Publication Data

US 2003/0202293 A1 Oct. 30, 2003

(30) Foreign Application Priority Data

Apr. 26, 2002 (JP) .......................... 2002-127127

(51) Int. Cl.[7] ................................. G11B 5/56
(52) U.S. Cl. ..................................... 360/294.1
(58) Field of Search ............... 360/294–294.6

(56) References Cited

U.S. PATENT DOCUMENTS 6,295,184 B1 * 9/2001 Takekado ............... 360/294.4
6,724,560 B2 * 4/2004 Koganezawa et al. ... 360/77.02

OTHER PUBLICATIONS

"Microactuator for Magnetic Disk Drive", Journal of the Institute of Electrical Engineer of Japan, vol. 120, No. 11, Nov. 2000, pp. 690–692.
S. Nakamura et al, "Flying–Height Characteristics and Lifetime of o–shaped Actuated Suspension", Japan Society of Mechanical Engineers, No. 01–1 [IV], pp. 227–228.

* cited by examiner

Primary Examiner—A. J. Heinz
(74) Attorney, Agent, or Firm—Mattingly, Stanger, Malur & Brundidge, P.C.

(57) ABSTRACT

There is provided a magnetic disk drive in which a flying-height fluctuation produced by the operation of a fine actuator is decreased, the reliability is high, and recording density is high. For this purpose, the magnetic disk drive is configured as described below. The magnetic disk drive has a suspension including a base plate connected to a carriage, a load beam fitted with a slider, and a fine actuator which is provided on the base plate and finely moves the load beam. The configuration is such that the shortest track travel time using the fine actuator is larger than the inverse number of the local maximum of a flying-height fluctuation frequency of the suspension by the fine actuator. Also, the configuration is such that the shortest track travel time using the fine actuator is larger than the inverse number of the natural frequency of first torsion mode of the suspension by the fine actuator.

4 Claims, 5 Drawing Sheets

DISK DRIVE HAVING A TWO-STAGE ACTUATOR FOR SUPPRESSING A FLYING-HEIGHT FLUCTUATION

BACKGROUND OF THE INVENTION

The present invention relates to a disk drive used for an external storage device of a computer and, more particularly, to a magnetic disk drive using a suspension type fine actuator.

PRIOR ART

A head positioning actuator aiming at high recording density of a magnetic disk constitutes a two-stage actuator by means of gain control with a VCM (voice coil motor). It achieves highly accurate head positioning and also improves track density. A specific configuration of two-stage actuator is described in "Microactuator for Magnetic Disk Drive" in the Journal of the Institute of Electrical Engineers of Japan, Vol. 120, No. 11, pp. 690–692 (November, 2000). According to this paper, the first-stage actuator is an ordinary VCM, and the second-stage actuator, that is, a fine actuator uses a piezoelectric element.

The fine actuators are classified into suspension actuators, slider actuators, and head actuators according to a difference in drive position thereof.

One example of a suspension actuator is described. As a configuration common to an actuator shown in FIG. 5, two piezoelectric elements are provided in a hinge portion (φ-shaped structure) of a base plate 6 connected with a carriage via a mounting hole (reference numeral 2b designates the center of mounting hole). The two piezoelectric elements are expanded and contracted alternately by a driving voltage of opposite phase applied to these piezoelectric elements, by which a minute displacement angle is generated in the hinge portion. This displacement angle is converted into displacement at the head position via a load beam 4b.

The two-stage actuator using the suspension actuator is useful for increasing the head positioning accuracy of magnetic disk drive.

SUMMARY OF THE INVENTION

As described in "Flying-height Characteristic and Lifetime of φ-shaped Actuated Suspension" in Transactions of the Japan Society of Mechanical Engineers, No. 01-1 [IV], pp. 227–228, vibrations of a suspension are excited by the operation of a fine actuator (piezoelectric element). The vibrations produce a flying-height fluctuation, which poses a problem of impairing the reliability of magnetic disk drive. In the worst case, a head collides with a disk, so that there arises a problem in that the data stored on the disk is destroyed, or a head element of transducer for recording/reproducing data is destroyed.

The present invention can solve the above problems, and provide a magnetic disk drive in which a flying-height fluctuation produced by the operation of a fine actuator is decreased, the reliability is high, and recording density is high.

The magnetic disk drive in accordance with the present invention mainly has a configuration and function as described below.

In the magnetic disk drive having a suspension including a base plate connected to a carriage, a load beam fitted with a slider, and a fine actuator which is provided on the base plate and finely moves the load beam, the shortest track travel time using the fine actuator is larger than the inverse number of the local maximum of a flying-height fluctuation frequency of the suspension by the fine actuator.

Alternatively, the shortest track travel time using the fine actuator is larger than the inverse number of the natural frequency of first torsion mode of the suspension by the fine actuator.

Thus, if the magnetic disk drive is configured so that the fine actuator such as a piezoelectric element is driven, for example, with a period of a multiple of natural frequency corresponding to the natural frequency of first torsion mode of suspension, the flying-height fluctuation of slider can be restrained.

Other objects, features and advantages of the invention will become apparent from the following description of the embodiments of the invention taken in conjunction with the accompanying drawings.

PREFERRED EMBODIMENTS OF THE INVENTION

Figure 1:
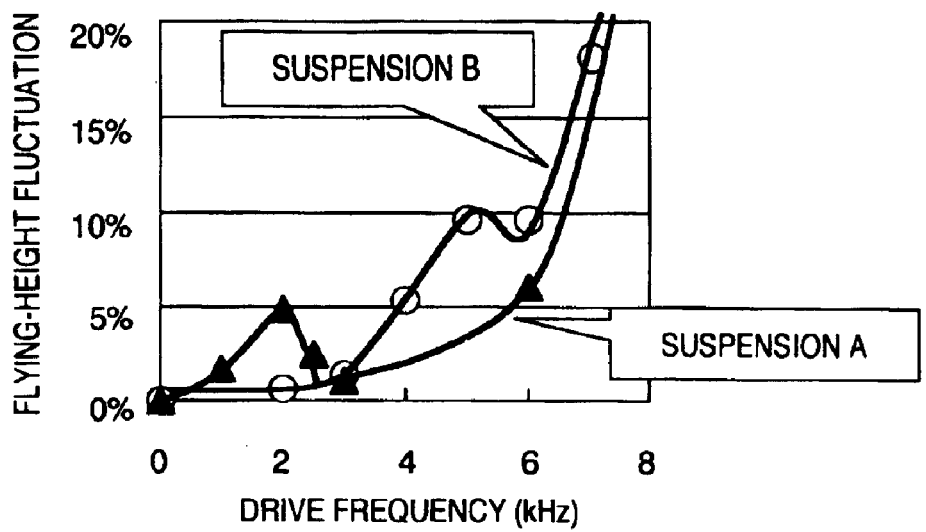
FIG. 1 is a characteristic diagram showing the relationship between flying-height fluctuation and piezo drive frequency in a suspension type fine actuator in accordance with an embodiment of the present invention.
Figure 2:
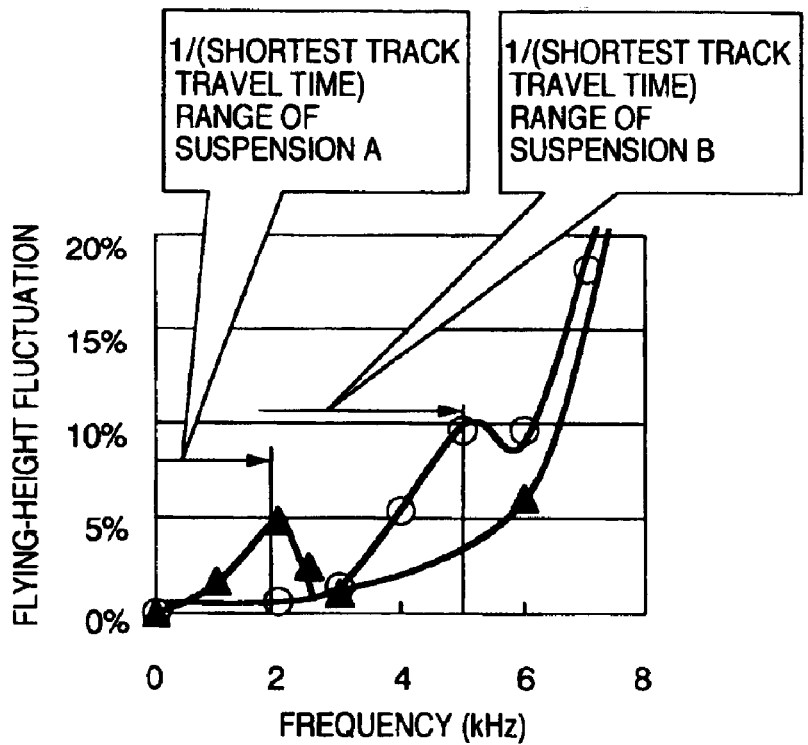
FIG. 2 is a graph showing the relationship between flying-height fluctuation and head travel vibration of the shortest track at the drive frequency shown in FIG. 1.
Figure 3:
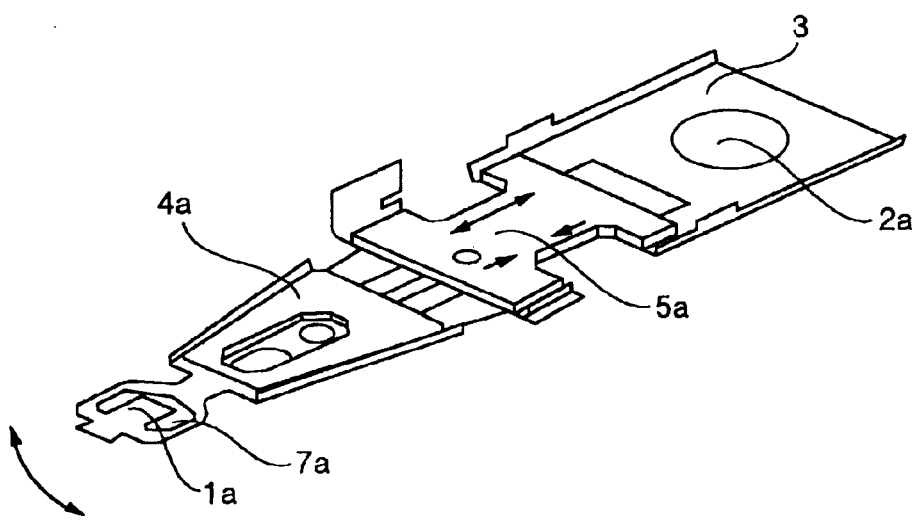
FIG. 3 is a perspective view showing a construction of a suspension A in accordance with the embodiment.
Figure 4:
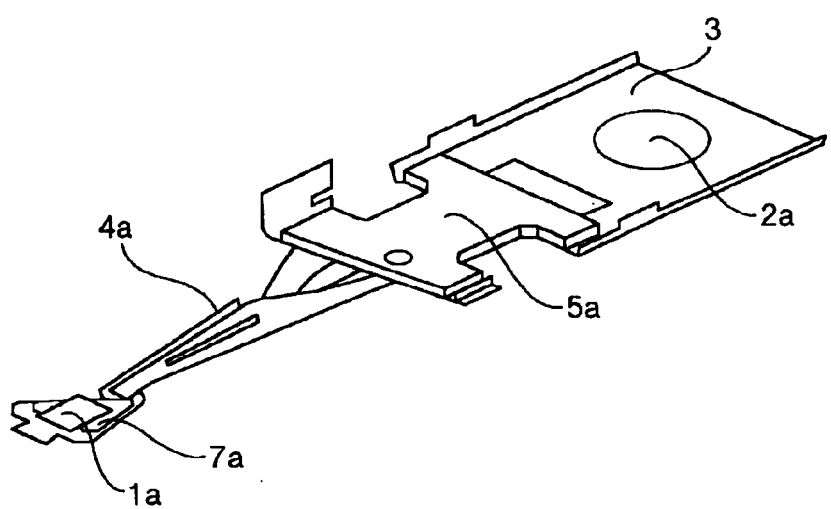
FIG. 4 is a perspective view showing a vibration mode of first torsion mode of a suspension A in accordance with the embodiment.

A magnetic disk drive using a suspension type fine actuator in accordance with an embodiment of the present invention will now be described in detail with reference to FIGS. 1 to 8. FIG. 1 is a characteristic diagram showing the relationship between flying-height fluctuation and piezo drive frequency in the suspension type fine actuator in accordance with this embodiment. FIG. 2 is a graph showing the relationship between flying-height fluctuation and head travel vibration of the shortest track at the drive frequency shown in FIG. 1. FIG. 3 is a perspective view showing a construction of a suspension A in accordance with this embodiment. FIG. 4 is a perspective view showing a vibration mode of first torsion mode of the suspension A.

Figure 5:
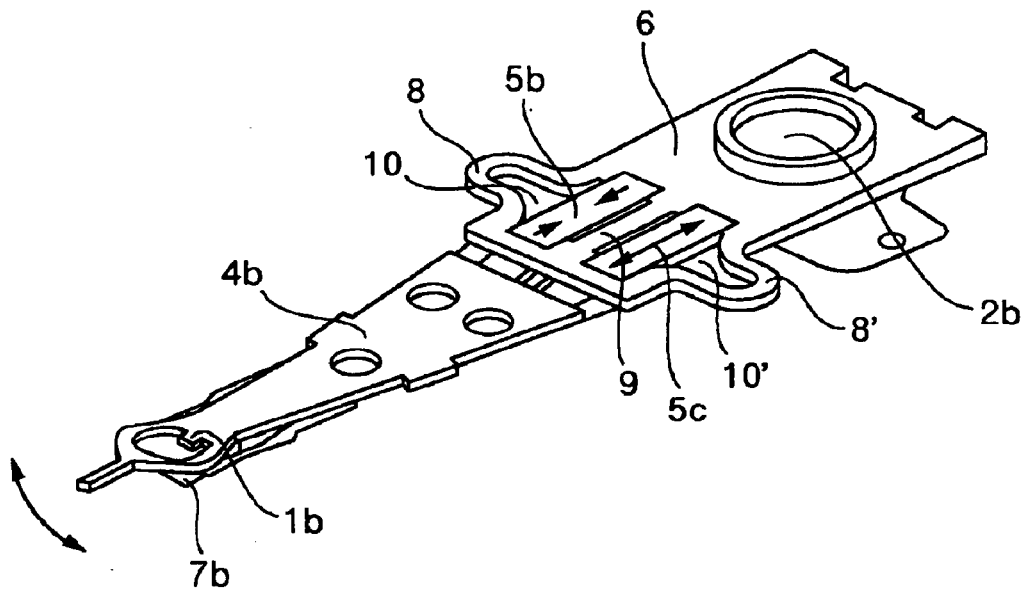
FIG. 5 is a perspective view showing a construction of a suspension B in accordance with the embodiment.
Figure 6:
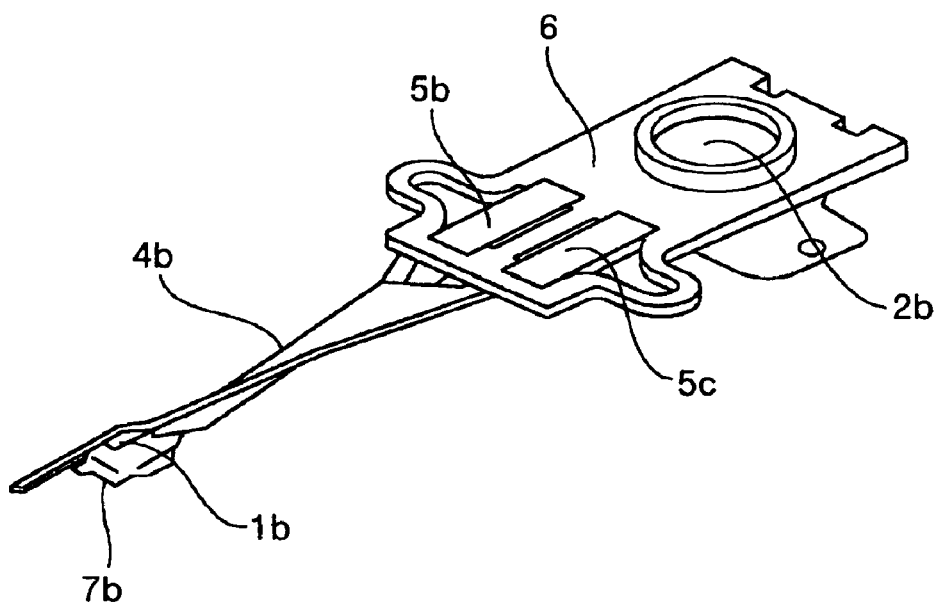
FIG. 6 is a perspective view showing a vibration mode of first torsion mode of a suspension B in accordance with the embodiment.
Figure 7:
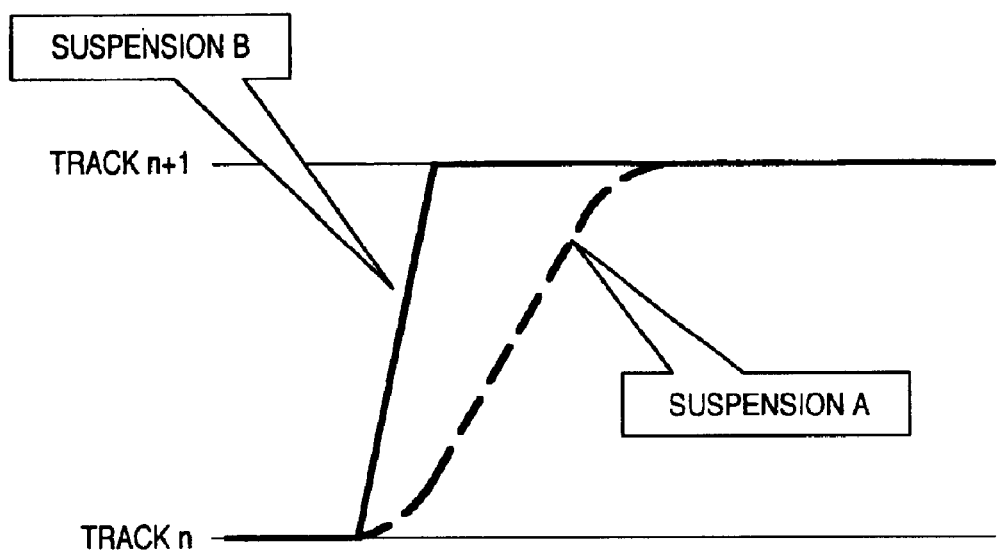
FIG. 7 is a schematic view showing the travel mode of a head to the shortest track.
Figure 8:
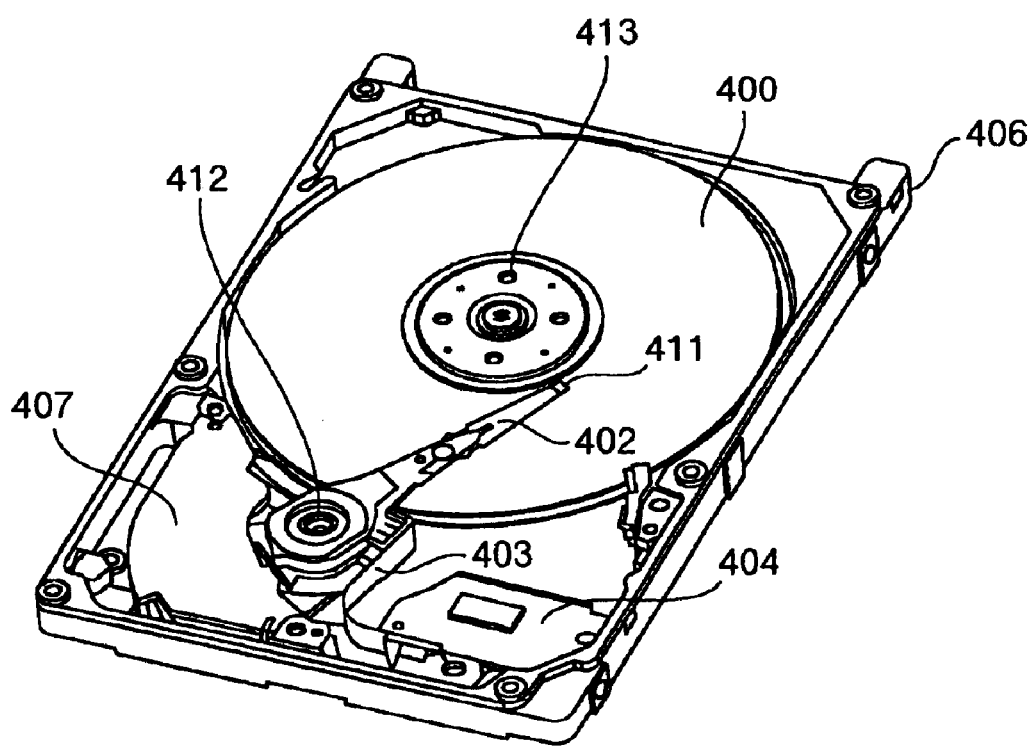
FIG. 8 is a perspective view showing a general configuration of a magnetic disk drive.

FIG. 5 is a perspective view showing a construction of a suspension B in accordance with this embodiment. FIG. 6 is a perspective view showing a vibration mode of first torsion mode of the suspension B in accordance with this embodiment. FIG. 7 is a diagram showing the travel mode of a head to the shortest track. FIG. 8 is a perspective view showing a general configuration of a magnetic disk drive.

First, the general configuration of the magnetic disk drive is described with reference to FIG. 8. For this magnetic disk drive, the interior of housing is enclosed by a housing 406 and a cover, and a spindle motor is fixed in the housing 406. To the spindle motor, a magnetic disk 400 is fixed by a clamp 413 with a spacer being interposed therebetween. The spindle motor and the magnetic disk 400 may be fixed to each other by bonding. This magnetic disk 400 has information recorded thereon.

On the housing 406 is provided an actuator. On this actuator, a magnetic head 411 for reading and/or writing information from and to the magnetic disk 400 is mounted at the tip end of a suspension 402 via a carriage 401. The actuator mounted with the magnetic head 411 has the degree of freedom in the radial direction of the magnetic disk 400 with a pivot 412 serving as a rotation center. Thereby, the magnetic head 411 is driven to a predetermined position on the magnetic disk 400 by a VCM (voice coil motor) fixed to the housing 406.

A signal read by the magnetic head 411 is amplified by a pre-main amplifier IC 404 via an FPC (flexible printed circuit) 403. The pre-main amplifier IC 404 is connected to a printed-circuit board (PCB: not shown in FIG. 8) via a connector (not shown in FIG. 8). Thereby, the signal amplified by the pre-main amplifier IC 404 is processed by electronic parts mounted on the PCB, and is sent to the outside of the magnetic disk drive by an external connector (not shown in FIG. 8).

As shown in FIG. 3, a suspension A includes a base plate 3 connected to the carriage (referred also to as an E block), not shown, via a mounting hole (reference numeral 2a designates the center of mounting hole), a piezoelectric element (fine actuator) 5a connected to the base plate 3, and a load beam 4a connected to the piezoelectric element 5a. A slider 7a is swayed in the arrow-marked direction, that is, the tracking direction by the movement of piezoelectric element 5a, for example, in the arrow-marked directions (moves to opposite phase to each other).

Examples of specific dimensions and material of the suspension A are shown. A distance between a center 1a at which the slider is mounted and the mounting hole center 2a at which the suspension A is mounted on the carriage (E block) of the magnetic disk drive is 18 mm. The base plate 3 and the load beam 4a are connected to each other via the piezoelectric element 5a. The base plate 3 is formed by laminating stainless steel materials with a thickness of 76 $\mu$m and a thickness of 200 $\mu$m. The load beam 4a is formed by partially laminating stainless steel materials with a thickness of 25 $\mu$m and visco elastic material (damping material for restraining vibration) with a thickness of 125 $\mu$m on a stainless steel material with a thickness of 25 $\mu$m (the visco elastic material is sandwiched between the stainless steel materials). The piezoelectric element 5a measures 6.3 mm long by 5.4 mm wide by 0.2 mm thick.

The natural frequency of first torsion mode of the suspension is determined by the influence of the rigidity of the base plate 3 and the piezoelectric element 5a on the mode (fixed value) determined dominantly by the torsional rigidity of the load beam 4a and the rotational inertia in the torsion direction (lengthwise direction) of the load beam 4a. The torsional rigidity, rotational inertia, and rigidity are determined by the material and shape. The natural frequency of first torsion mode shown in FIG. 4 is about 2 kHz.

FIG. 5 is a perspective view of a suspension B in accordance with this embodiment. A vibration mode of first torsion mode of the suspension B is shown in FIG. 6. The suspension B includes a base plate (referred also to as a base plate hinge) 6 which is connected to a turning carriage (referred also to as an E block), not shown, via a mounting hole (reference numeral 2b designates the center of mounting hole), two piezoelectric elements (fine actuators) 5b and 5c which are provided over a hollow portion of a φ-shaped structure formed on the end side of the base plate 6, and a load beam 4b connected to the end of the φ-shaped structure.

The end construction on the load beam 4b side of the base plate 6 is formed by Ω-shaped side portions 8 and 8', a central connecting element 9, and hollow portions 10 and 10' between the central connecting element 9 and the Ω-shaped side portion 8, 8'. The end portion of the base plate 6 is swayed by the expansion and contraction in the reverse direction to each other by the piezoelectric elements 5b and 5c. A slider 7b moves in the track crossing direction as in the arrow-marked direction along with the expansion and contraction of the piezoelectric elements 5b and 5c. The load beam 4b may be connected to each end of piezoelectric elements 5b and 5c in place of the above-described φ-shaped structure.

Examples of specific dimensions and material of the suspension B are shown. A distance between a center 1b at which the slider is mounted and the mounting hole center 2b at which the suspension B is mounted on the carriage (E block) of the magnetic disk drive is 14.5 mm. The two piezoelectric elements 5b and 5c are embedded in the φ-shaped base plate hinge. The base plate 6 is formed of a stainless steel material with a thickness of 0.2 mm, and the load beam 4b is formed of a stainless steel material with a thickness of 0.1 mm. The two piezoelectric elements 5b and 5c each measure 2.8 mm long by 1 mm wide by 0.5 mm thick. The natural frequency of first torsion mode shown in FIG. 6 is about 5 kHz.

Next, the flying-height fluctuation of head will be described. The frequency characteristics of flying-height fluctuation usually increase monotonously toward the resonance frequency of air film of the slider 7 installed on the suspension. However, a peculiar flying-height fluctuation occurs at a frequency of about 2 kHz for the suspension A and about 5 to 6 kHz for the suspension B (see FIGS. 1 and 2). The reason for this is the influence of first torsion mode of suspension shown in FIGS. 4 and 6.

In this embodiment, therefore, it is necessary to operate the piezoelectric element 5 so that a torsion mode of suspension in which a peculiar flying-height fluctuation occurs (about 2 kHz for the suspension A, about 5 kHz for the suspension B) is not applied. Specifically, head positioning is performed by the tracking fine actuator at a frequency not higher than the frequency at which the flying-height fluctuation is at the maximal (although described later, specifically, at a frequency of ½ or higher of the maximal frequency because FIGS. 1 and 2 reveal that the flying-height fluctuation increases remarkably at frequencies of ½ or higher of the maximal frequency (about 2 kHz for the suspension A, about 5 kHz for the suspension B)).

The head positioning operation in the magnetic disk drive includes following operation in which the head is caused to follow the track on which the data is recorded/reproduced and seeking operation in which the head is moved from track to track. In the following operation, since the operation distance of actuator is small, a flying-height fluctuation due to the operation of actuator scarcely occurs. In the seeking operation, however, since the operation distance of actuator is large, a flying-height fluctuation due to the operation of actuator occurs greatly.

FIG. 1 shows a flying-height fluctuation at the time when the head travel distance is ±1 μm (since the flying-height fluctuation cannot be observed if the head travel distance is very small, a head travel distance of ±1 μm is necessary for reliable observation of flying-height fluctuation). This head travel distance corresponds to ±4 tracks in the magnetic-disk drive of 100 kTPI. In the case of the suspension A, if the head is moved through 8 tracks (±4 tracks) at a frequency at which the flying-height fluctuation is at the maximal (2 kHz), a flying-height fluctuation as large as 5% of the steady flying height occurs (if the head is moved through ±1 μm at 2 kHz in FIG. 1, a flying-height fluctuation of 5% occurs). However, if the head is operated at a frequency not higher than the frequency at which the flying-height fluctuation is at the maximal, for example, at 1 kHz, which is a half of the frequency, the flying-height fluctuation can be kept at 1.6% (according to an experimental result).

In the case of the suspension B, if the head is moved through 8 tracks (±4 tracks) at a frequency at which the flying-height fluctuation is at the maximal (5 kHz), a flying-height fluctuation as large as 10% of the steady flying height occurs. However, if the head is operated at a frequency not higher than the frequency at which the flying-height fluctuation is at the maximal, for example, at 3 kHz, the flying-height fluctuation can be kept at 1.3% (according to an experimental result).

FIG. 7 is a schematic view of head travel. The longitudinal direction of FIG. 7 denotes a travel distance in the disk radial direction of the head. The transverse direction of FIG. 7 denotes time or a travel distance in the disk circumferential direction of the head. The above-described head travel distance is the travel distance in the disk radial direction. Herein, the travel frequency of head is determined by the shortest track travel time. The shortest track travel time is travel time for 1 track seek, that is, for the travel from track n to track n+1.

The travel path for 1 track seek draws a substantially cosine curve as shown in FIG. 7 to restrain vibrations. In this case, the path for 1 track seek is a half period (the travel path returning from track n to track n through track n+1 is one period). Therefore, in order not to excite first torsion mode of suspension by the operation of fine actuator (piezoelectric element), basically, (0.5/the shortest track travel time) of magnetic disk drive has only to be made lower than the natural frequency of first torsion mode of suspension by the operation of fine actuator (made lower than the frequency exhibiting the local maximum of characteristics shown in FIG. 2). That is to say, ½ of the inverse number of the shortest track travel time has only to be made lower than the natural frequency of first torsion mode of suspension. Actually, since the local maximum of the characteristic curve shown in FIG. 1 is determined as an attribute of suspension, the travel time for seeking operation, specifically, the shortest track travel time (½ period of 1 track seek) is specified so that the flying-height fluctuation is lower than this local maximum.

However, as shown in FIG. 1, the frequency at which a flying-height fluctuation occurs has a width. Therefore, a margin of two times is taken into account, and the natural frequency of first torsion mode by the operation of fine actuator is made higher than 1/(the shortest track travel time) of magnetic disk drive, by which the flying-height fluctuation of head can be restrained (the local maximum can be avoided). In other words, it can be said that if the driving is performed by the piezoelectric element at a frequency of ½ of the drive frequency exhibiting the local maximum of characteristic curve in FIGS. 1 and 2, the flying-height fluctuation decreases significantly.

Inversely, if the shortest track travel time using the fine actuator is made two times or more of 0.5/(the natural frequency of first torsion mode of fine actuator), the flying-height fluctuation caused by the operation of fine actuator can be restrained (the local maximum can be avoided).

In the case of the suspension A, the natural frequency of first torsion mode occurs at 2 kHz, and the local maximum of flying-height fluctuation also occurs at 2 kHz. Therefore, if 1 track seek time is set to 0.5 ms or longer, the flying-height fluctuation can be restrained significantly. In the case of the suspension B, the natural frequency of first torsion mode occurs at 5 to 6 kHz, and the local maximum of flying-height fluctuation occurs at 5 kHz. Therefore, if 1 track seek time is set to 0.2 ms or longer, the flying-height fluctuation can be restrained significantly. Inversely, in order to make 1 track seek time 0.1 ms and to significantly restrain the flying-height fluctuation, the natural frequency of first torsion mode of suspension has only to be designed so as to be not lower than 10 kHz.

Specifically, in the case of the suspension A, the natural frequency of 2 kHz means that the period of first torsion mode is $1/(2 \times 10^3)$ sec=0.5 ms. The driving by using the piezoelectric element has only to be performed with a period of 1.0 ms, which is a multiple of 0.5 (since the travel from track n to track n+1 in FIG. 7 is a half period, the period is 0.5 ms).

In this embodiment, there has been described a case where the local maximum of flying-height fluctuation by the operation of fine actuator is produced by the excitation of first torsion mode of suspension. However, the present invention is not limited to this case. Even in a case where the local maximum of flying-height fluctuation is produced by other vibration modes of suspension or E block, or vibrations, minute shocks, etc. entering from the outside due to an environment in which the magnetic disk drive is installed (for example, the local maximum of flying-height fluctuation frequency of suspension), the same effects as those of this embodiment can be obtained by operating the fine actuator in a frequency zone lower than the frequency at which the local maximum is produced. Also, the natural frequency of suspension or E block has only to be designed to be 1/(1 track-seek time) or higher so that no flying-height fluctuation occurs at the time of head travel.

Although a magnetic disk drive has been described in this embodiment, the same effects can be obtained even in the case where the suspension actuator is used in an information storage device using a floating head such as an optical disk drive using a floating head.

According to this embodiment, the flying-height fluctuation produced by the operation of fine actuator can be decreased, so that a magnetic disk drive having high reliability and high recording density can be realized.

It should be further understood by those skilled in the art that although the foregoing description has been made on embodiments of the invention, the invention is not limited thereto and various changes and modifications may be made without departing from the spirit of the invention and the scope

What is claimed is:

1. A disk drive comprising:
   a disk for recording information; and
   a suspension provided with a slider for reading information recorded on said disk, having:
   a base plate connected to a carriage; and
   a fine actuator for finely moving a load beam which is provided on said base plate and fitted with said slider, wherein the shortest track travel time using said fine actuator is larger than the inverse number of a local maximum of a flying-height fluctuation frequency of said suspension by said fine actuator, said shortest track travel time being larger than twice the inverse number of said local maximum and the flying-height fluctuation of the suspension being within 5% of the limit of said shortest track travel time.

2. A disk drive comprising:

a disk for recording information; and a suspension provided with a slider for reading information recorded on said disk, having:

a base plate connected to a carriage; and a fine actuator for finely moving a load beam which is provided on said base plate and fitted with said slider, wherein the shortest track travel time using said fine actuator is larger than the inverse number of a natural frequency of first torsion mode of said suspension by said fine actuator, said shortest track travel time being larger than twice the inverse number of said natural frequency and the flying-height fluctuation of the suspension being within 5% of the limit of said shortest track travel time.

3. A disk drive comprising:

a disk for recording information; and a suspension provided with a slider for reading information recorded on said disk, having:

a base plate connected to a carriage;

a load beam which is provided on said base plate and fitted with said slider; and a fine actuator consisting of a piezoelectric element interposed between said base plate and said load beam, wherein said fine actuator travels through the shortest track at a frequency not higher than ½ of a natural frequency of a first torsion mode of said suspension, the natural frequency being at least twice the maximum value of the frequency range which said natural frequency of said first torsion mode uses the shape of the base plate, the load beam and the fine actuator for constituting said suspension, a time for traveling said shortest track being larger than twice the inverse number of said natural frequency and the flying-height fluctuation of the suspension being within 5% of the limit of said time.

4. A disk drive comprising:

a disk for recording information; and a suspension provided with a slider for reading information recorded on said disk, having:

a base plate connected to a carriage;

a fine actuator consisting of a piezoelectric element provided on a φ-shaped structure on the end side of said base plate; and a load beam one end of which is connected to the end of said base plate and the other end of which is fitted with said slider for mounting a magnetic head, wherein for said fine actuator, a natural frequency of first torsion mode of said suspension is higher than 1/(the shortest track travel time by fine actuator), the natural frequency being at least twice than the maximum value of the frequency range which said natural frequency of said first torsion mode uses the shape of the base plate, the load beam and the fine actuator for constituting said suspension and being at least two times more than 1/(the shortest track travel time), said shortest track travel being larger than two times the inverse number of said natural frequency and the flying-height fluctuation of the suspension being within 5% of the limit of said shortest track travel time.

* * * * *